Patented Jan. 6, 1953

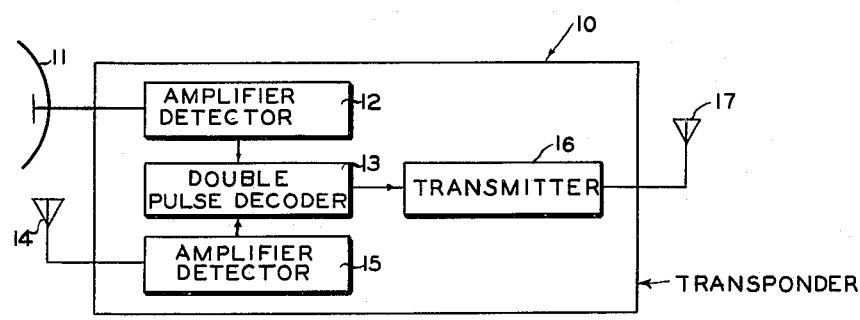
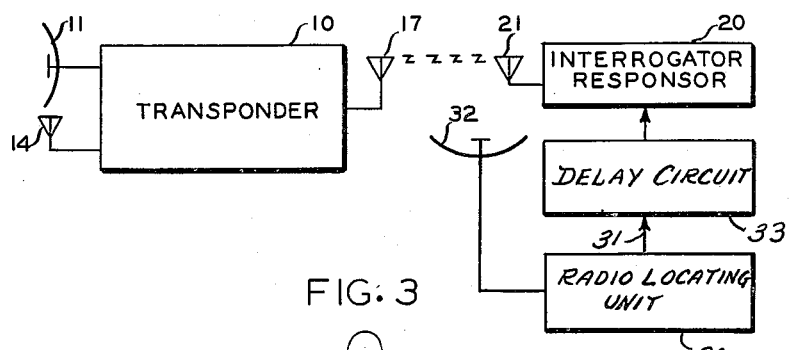
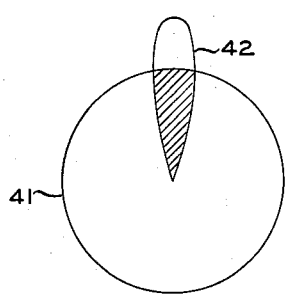

2,624,873

UNITED STATES PATENT OFFICE 2,624,873

OBJECT LOCATING IDENTIFICATION SYSTEM

Leon Bess, Boston, Mass., assignor, by mesne assignments, to the United States of America as represented by the Secretary of War Application April 18, 1945, Serial No. 588,994

1 Claim. (Cl. 343—6)

My invention relates in general to radio apparatus for the transmission and reception of predetermined signals, and more particularly to an electronic system of identification by means of such said predetermined signals.

Developments in the electronic art have made possible the locating of certain remote objects such as aircraft by a radio means, hereinafter referred to as a radio locating means, that transmits electromagnetic energy which is reflected back to the transmitting means from the remote object. Although such a system provides an indication of the geometric location of all such remote objects within certain practical limitations, it does not by itself provide a means for identification of any individual remote object other than by space position. Therefore, in conjunction with such means, it has been found desirable and advantageous to use an electronic system of identification whereby certain of the remote objects provided with proper electronic means, hereinafter referred to as transponders, are responsive to predetermined radio signals and in turn transmit an identifying signal. This response is of the nature of predetermined electrical signals which can be identified by a second electronic means hereinafter referred to as an interrogator-responsor, and at the same time aid in providing data as to the distance of the transponder to the interrogator-responsor. Heretofore, the identification systems developed have provided identification or discrimination between remote objects at different distances from the identification system but without azimuth discrimination. Thus, where more than one remote object at least one of which is provided with electronic identifying means is detected by the radio locating means at the same distance but with different azimuth bearings, there is no means of discrimination to determine which of the objects at the given distance is responding with the identification signal.

Accordingly, it is one of the objects of my invention to provide a means for determining the azimuth of a remote object which is responding to predetermined electrical signals transmitted by an identification system and to thereby provide a means for differentiating between a remote object provided with a responding means and all other objects which are an equal distance away but having different azimuth bearings from the identification system.

In general, my invention embodies in part an identification system composed of well known circuits hereinafter referred to in this application as an interrogator-responsor. This system is essentially a means comprising well known circuits for transmitting and receiving pulse modulated radio frequency energy using an antenna with a circular field pattern. This system also embodies well known electronic circuits and apparatus for indicating the distance from the interrogator-responsor to a replying transponder unit by electronically measuring the time for radiant energy to travel to the transponder and for the indentifying radiant energy to travel back to the interrogator-responsor. Examples of such circuits and apparatus adaptable to the above purposes are disclosed in Patent No. 2,480,208 by Luis W. Alvarez. Provided in the remote object to be identified is an electronic means, hereinafter referred to in this application as a transponder, consisting of certain well known circuits for receiving and transmitting certain predetermined signals. Used in conjunction with the interogator-responsor is a means for transmitting radio energy in a highly directionalized beam, the azimuth bearing of which is known, such as is provided in a radio locating means. Typical circuits and apparatus such as comprise the aforementioned radio locating means are disclosed in the previously mentioned patent to Luis W. Alvarez. The transponder is so constructed that it is only responsive to a succession of at least two pulses which are separated by the predetermined time interval, the first pulse being from the radio locating means while the second pulse is from the interrogator-responsor system. Since the radiation pattern from the interrogator-responsor system is non-directional or circular and the radio locating system has a highly directionalized beam, the only area that will be interrogated will be the area covered at any particular instant by the radio locating beam. Since the azimuth bearing of this beam is known from the radio locating means, any response to the interrogator-responsor will be received from a transponder that lies within the beam limits of the radio locating means and therefore its azimuth will be known.

My invention will best be understood by reference to the appended drawings in which:

Fig. 1 shows a block diagram of the transponder;

Fig. 2 shows a block diagram of the over-all system; and

Fig. 3 shows a diagram of the combined field patterns for the interrogator-responsor and radio locating means.

Shown in Fig. 1 is a block diagram representing the transponder 10 which is located in the remote object. An antenna means 11 serves to receive the radio frequency energy pulses transmitted by the radio locating means and transfers these pulses to an amplifier-detector means 12. The amplifier-detector means 12 feeds the amplified-detected signals into a double pulse decoding circuit 13, which is a circuit described in my co-pending application entitled "Electrical Circuit" filed this even date herewith Serial No. 588,993, now Patent No. 2,580,213, and is particularly suitable where the pulses are not simultaneous but are separated by a suitable interval; this comprises a delay circuit to make the first pulse coincide with the second and a coincidence circuit to cause an effective output upon such coincidence. Various other circuits within the skill of the art are also suitable where the pulses are either separated or simultaneous, the latter avoiding the need for delay means. The function of this circuit is to be responsive to two video pulses separated by a predetermined time interval and to produce a keying or control voltage when such pulses are properly applied. Another antenna means 14 is provided to receive pulses at the frequency transmitted by the interrogator-responsor. After reception, these pulses are amplified and detected in an amplifier-detector 15 and then fed into the double pulse decoder 13. The output of the double pulse decoder 13 keys a transmitting unit 16 which radiates its transmission from an antenna means 17.

Shown in Fig. 2, is a block diagram of the overall system. The interrogator-responsor unit 20 is a combination of well known circuits for the transmission and reception of pulse modulated radio frequency signals. The radiating means or antenna 21 for this unit is non-directional so that the radiation pattern for the transmitted energy is circular. In conjunction with the interrogator-responsor unit 20 a radio locating means 30 is used. This means provides transmission of radio frequency pulses from a radiating means 32 which has a highly directionalized radiation pattern in the form of a beam, the direction or azimuth of this beam being indicated on a means incorporated in this unit 30. This radio locating means 30 is a combination of already known circuits and apparatus for the purpose of locating remote objects by providing azimuth and distance data from information provided by the reflection of electromagnetic radiation from the remote objects. A timing pulse from the radio locating unit 30 is applied through connecting lead 31 to a delay circuit 33 wherein said pulse is delayed by a predetermined time interval. The delayed pulse keys the interrogator-responsor 20. The output of the entire transmitting system therefore comprises a first series of radio frequency pulses from the radio locating unit 30 and a second series of radio frequency pulses from the interrogator-responsor 20, each pulse of the second series being delayed by said predetermined time interval from its corresponding pulse in the first series.

Fig. 3 is a diagram of the combined field pattern of the interrogator-responsor antenna and the radiating means of the radio locating unit for one particular azimuth setting of the radio locating unit. The pattern 41 of interrogator-responsor 20 is circular and is overlapped by the pattern 42 of radio locating unit 30 so that only in the overlapping area does there exist the necessary double pulses to make the transponder 10 responsive.

The operation of the entire system is such that at a predetermined time after the transmission of a pulse by the radio locating unit 30, a second pulse is transmitted from the interrogator-responsor 20. Any transponder 10 located within the overlapping portion of the field pattern from 20 and 30 will receive both pulses and be responsive thereto by transmitting a signal of its own which will be received by the interrogator-responsor thus providing an identifying response to the interrogator-responsor. The bearing in azimuth of the radiating means of 30 at the time that the aforementioned response is received indicates the bearing of the remote object provided with the transponder.

It will be apparent to those skilled in the art that changes and adaptations can be made in the specific system herein described without departing from the spirit or idea of my invention, and I claim all such modifications as fall fairly within the spirit and scope of the hereinafter appended claim.

What I claim is:

An identification system comprising, at a local station, a radio locating unit having a rotating directional antenna for transmitting a first series of exploratory pulses and receiving reflected echoes thereof, and a transmitter-receiver coupled to said radio locating unit and having an omnidirectional antenna for transmitting a second series of exploratory pulses synchronized with said first series, corresponding pulses of said first and second series being time-delayed relative to each other by a given amount, said omnidirectional antenna also receiving signals transmitted from a remote object; and at said remote object a normally inoperative transmitter, receiving means for receiving said first and second series of pulses, and means responsive to the output of said receiving means and coupled to said transmitter for rendering said transmitter operative only in response to double pulses delayed in time relative to each other by said given amount.

LEON BESS.

REFERENCES CITED

The following references are of record in the file of this patent:

UNITED STATES PATENTS

| Number | Name | Date |
| --- | --- | --- |
| 2,248,215 | Budenbom | July 8, 1941 |
| 2,252,083 | Luck | Aug. 12, 1941 |
| 2,444,452 | Labin | July 16, 1948 |
| 2,448,016 | Busignies | Aug. 31, 1948 |
| 2,453,970 | Charrier | Nov. 16, 1948 |
| 2,466,711 | Kenyon | Apr. 12, 1949 |
| 2,468,045 | Deloraine | Apr. 26, 1949 |
| 2,471,373 | Joyner | May 24, 1949 |
| 2,459,811 | Grieg | Jan. 25, 1949 |
| 2,515,178 | Barchok | July 18, 1950 |
| 2,530,096 | Sudman | Nov. 14, 1950 |
| 2,531,412 | Deloraine | Nov. 28, 1950 |
| 2,537,102 | Stokes | Jan. 9, 1951 |
| 2,540,087 | Barchok | Feb. 6, 1951 |
| 2,568,265 | Alvarez | Sept. 18, 1951 |